Figure 1:
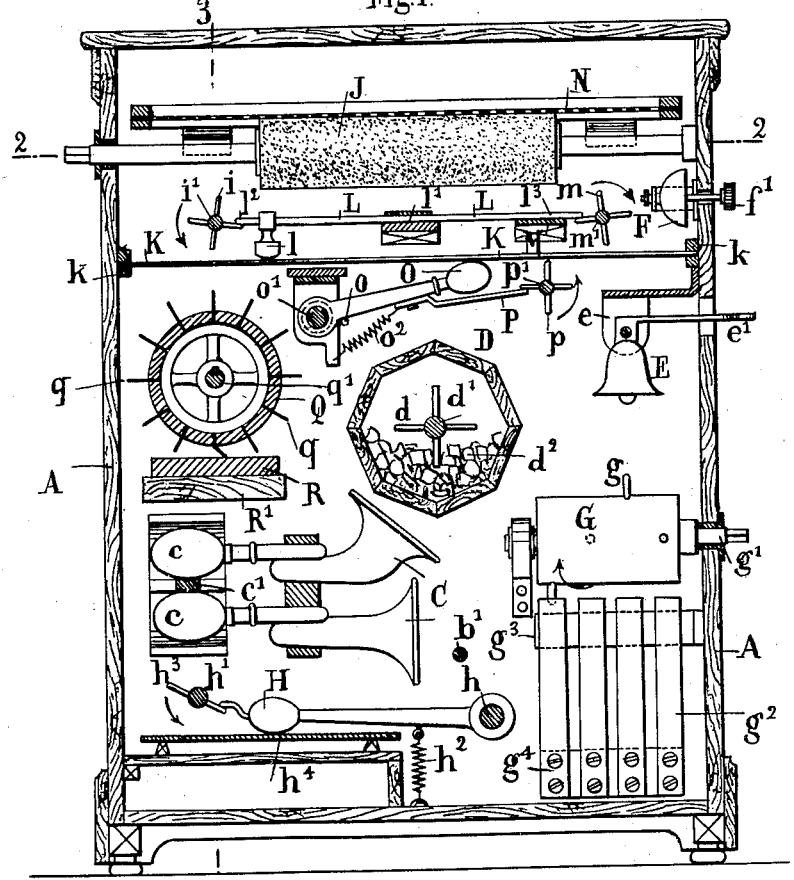

J. C. S. ROUSSELOT.
STAGE NOISE CABINET.
APPLICATION FILED APR. 18, 1908.

928,070.

Patented July 13, 1909.
6 SHEETS—SHEET 1.

WITNESSES
L. H. Grote
N. E. Keir

INVENTOR
Jean Charles Scipion Rousselot
BY
Howson and Howson
ATTORNEYS

J. C. S. ROUSSELOT.
STAGE NOISE CABINET.
APPLICATION FILED APR. 18, 1908.

928,070.

Patented July 13, 1909.
6 SHEETS—SHEET 2.

WITNESSES
L. H. Grote
M. E. Keir

INVENTOR
Jean Charles Scipion Rousselot
BY
Howson and Howson
ATTORNEYS

J. C. S. ROUSSELOT.
STAGE NOISE CABINET.
APPLICATION FILED APR. 18, 1908.

928,070.

Patented July 13, 1909.
6 SHEETS—SHEET 3.

WITNESSES

INVENTOR
Jean Charles Scipion Rousselot
BY
Howson and Howson
ATTORNEYS

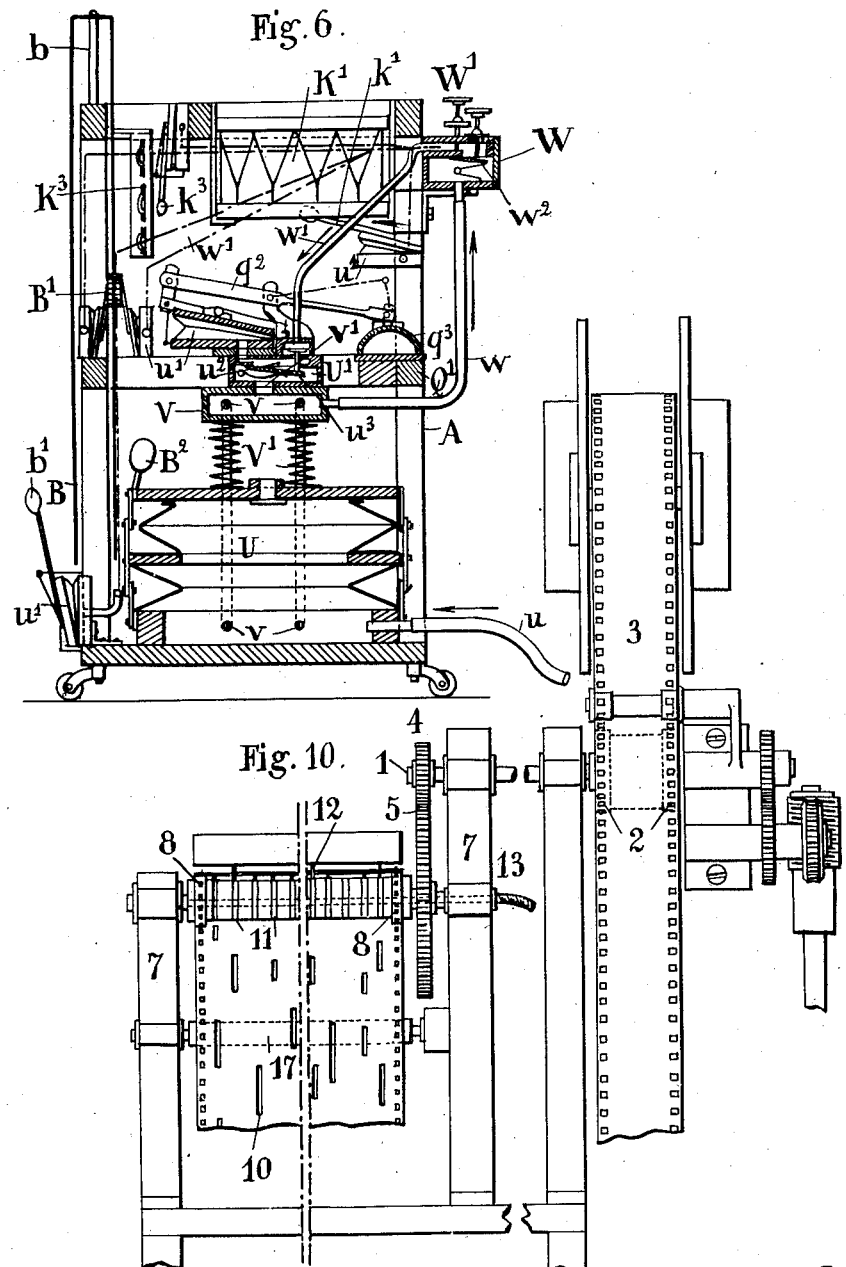

J. C. S. ROUSSELOT.
STAGE NOISE CABINET.
APPLICATION FILED APR. 18, 1908.

928,070.

Patented July 13, 1909.
6 SHEETS—SHEET 5.

J. C. S. ROUSSELOT.
STAGE NOISE CABINET.
APPLICATION FILED APR. 18, 1908.

928,070.

Patented July 13, 1909.
6 SHEETS—SHEET 6.

WITNESSES

INVENTOR
Jean Charles Scipion Rousselot
BY

ATTORNEYS

UNITED STATES PATENT OFFICE.

JEAN CHARLES SCIPION ROUSSELOT, OF PARIS, FRANCE.

STAGE-NOISE CABINET.

No. 928,070.　　　Specification of Letters Patent.　　　Patented July 13, 1909.

Application filed April 18, 1908.　Serial No. 427,911.

*To all whom it may concern:*

Be it known that I, JEAN CHARLES SCIPION ROUSSELOT, a citizen of the Republic of France, residing in Paris, Seine, France, have invented certain new and useful Improvements in Stage - Noise Cabinets, of which invention the following is a full, clear, and exact description, and for which I have applied for Letters Patent in France, dated April 19, 1907, No. 376,926.

It is known that in theaters, spectacles and the like, and more especially in those in which kinematographs are worked, properties are employed and operated in the wings, to produce divers noises and sounds corresponding to the scenes represented, in such a way as to give them more life and verisimilitude. Thus, in scenes where a storm is represented at the same time there must be heard the noise of the falling rain and the thunder; for military scenes, fusillades and the sound of the cannon are required; for fires, the warning of the horn announcing the passage of the firemen, and so on. To obtain these noises, it is necessary to station often as many as ten men or operators especially charged with this work. Another disadvantage is due to the scattering of the different apparatus in different parts of the wings; lastly it happens frequently that the sounds are produced too late or too early.

Figure 2:
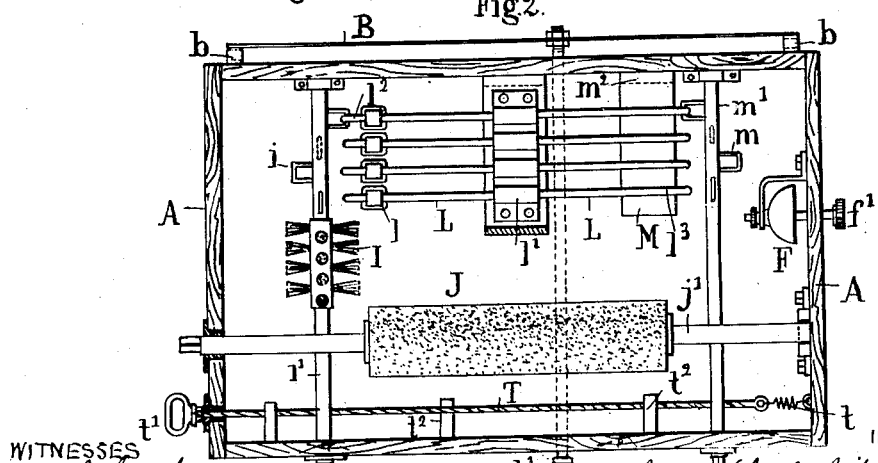
Figure 3:
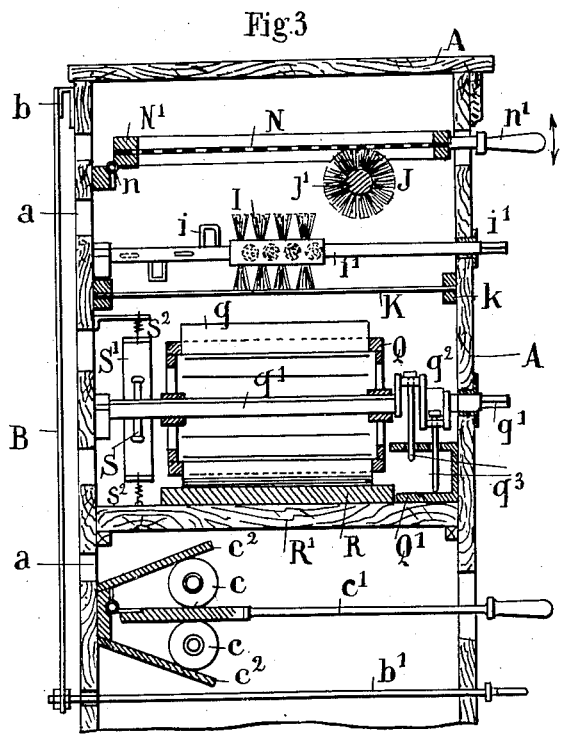
Figure 4:
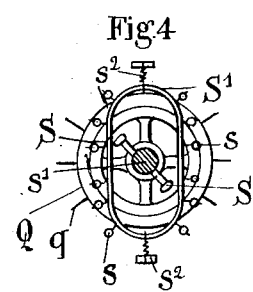
Figure 5:
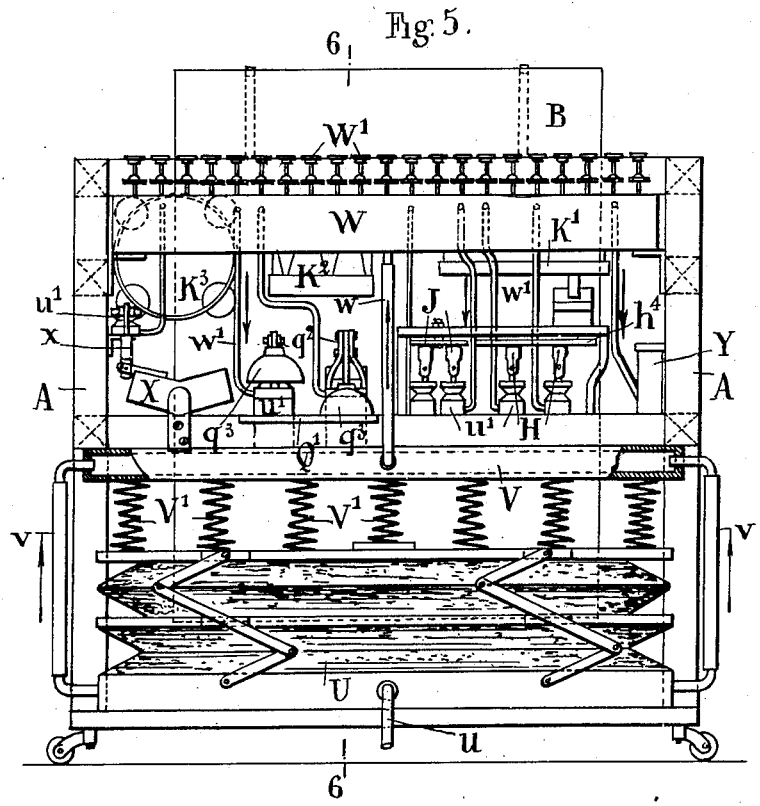
Figure 7:
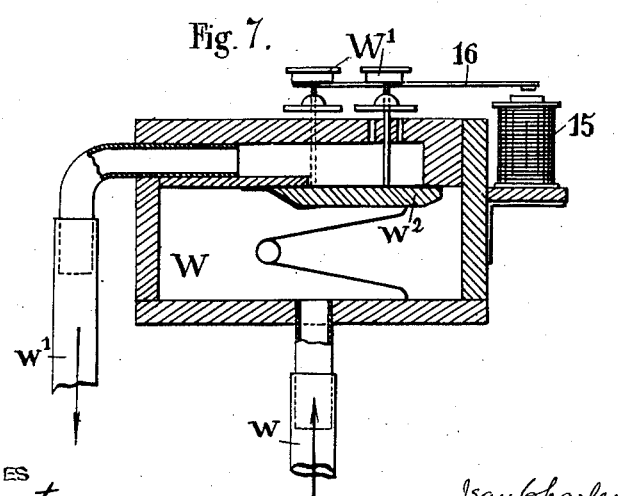
Figure 8:
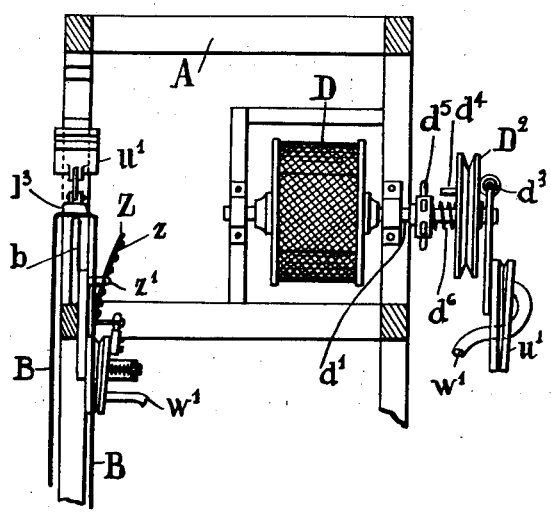
Figure 9:
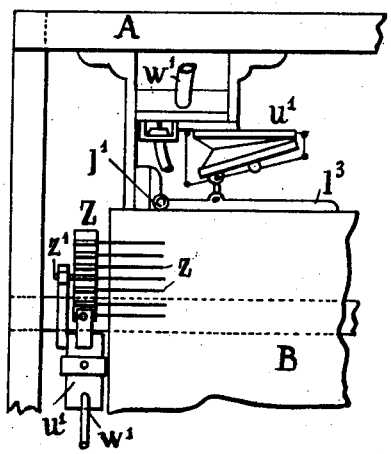
Figure 11:
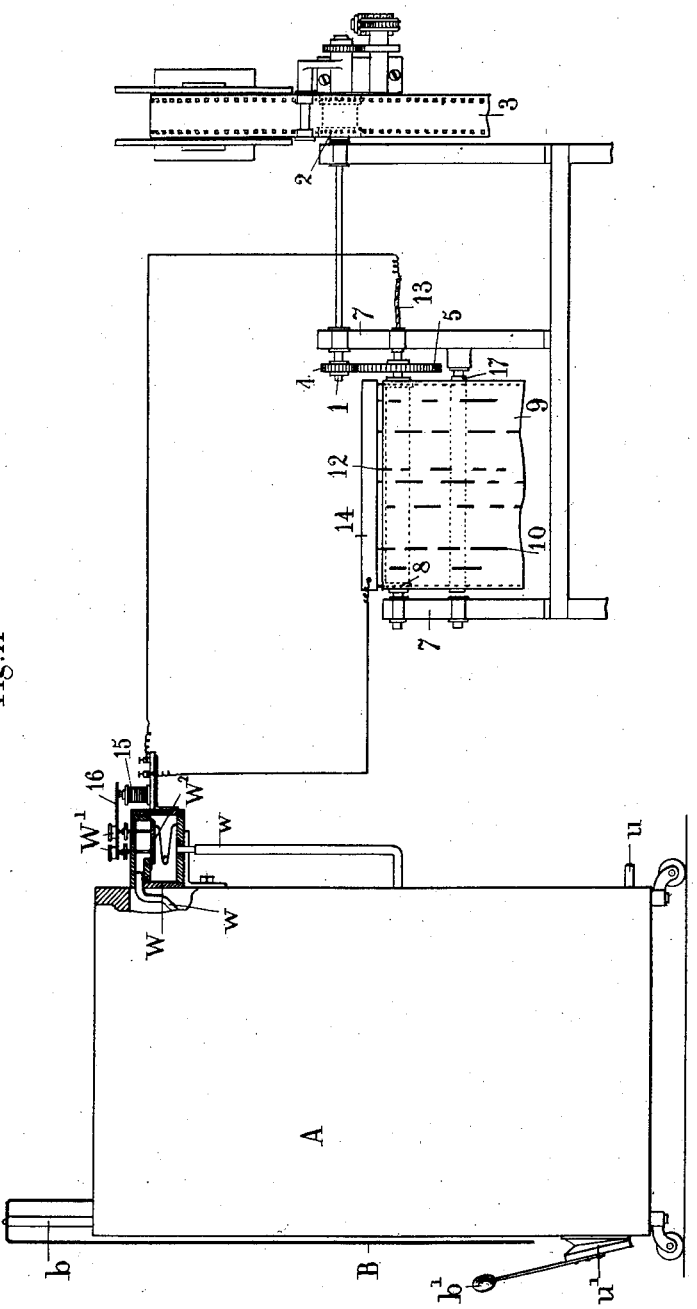

This invention has for object on the one hand the creation of new sounds and their control and on the other hand the centralization of all the devices in a single cabinet of handy and compact construction, allowing not only of having all the arrangements at hand but likewise of reducing to the minimum the number of operators employed; moreover, the presence of certain devices such as a sounding board and diaphragm allows of harmonizing and increasing the noises and sounds of the other arrangements as is hereafter described with reference to the annexed drawings in which:

Figure 1 is a front elevation, partly in section, the doors of the cabinet being removed. Fig. 2 is a view in horizontal section upon line 2—2 of Fig. 1. Fig. 3 shows a portion of a vertical cross section upon line 3—3 of Fig. 1. Fig. 4 shows a detail of Fig. 3. Fig. 5 is a front view partly in section of a modified construction; Fig. 6 is a cross section upon line 6—6, of Fig. 5; Fig. 7 is a vertical section of a valve chamber drawn to a larger scale; Figs. 8 and 9 are elevations of details; and Fig. 10 is a diagrammatic view of a controlling system for the different noise mechanisms. Fig. 11 is a similar view of this controlling system arranged to automatically operate the cabinet synchronously with a kinematograph apparatus.

The cabinet proper A is formed by a case, furnished in front with doors or not, the bottom or back wall presenting holes $a$ (Fig. 3).

B is a sounding plate fixed at its upper extremity at $b$ (Figs. 2 and 3) and provided at its lower portion with a lever handle $b'$ allowing of setting it in vibration, with a view to producing the sound of thunder in particular.

C C are horns, for instance of automobiles, with rubber bulb $c$ operated by the pivoted lever-handle $c'$ which allows of pressing the bulbs $c$ against the boards $c^2$, to make the said horns sound.

D represents a rotary cylinder, $d$ a number of arms, $d'$ the axis of rotation and $d^2$ pieces of cast iron, earthenware, etc.; by turning the cylinder D and the arms $d$, by means of the spindle $d'$, there are produced the sounds of broken crockery.

E is a bell, hung at $e$ with a controlling lever-handle $e'$ (Fig. 1) and F a gong operated by rotation or pressure at $f'$.

At G is shown a cylinder with pins $g$, revolved by the shaft $g'$; the pins $g$ in turning lift in succession the wooden laths $g^2$ fixed at $g^4$ and falling again with force upon a wooden plank $g^3$ imitating the sound of a fusillade, in case of rapid rotation of the shaft $g'$.

The sounds of an anvil are produced by a hammer H pivoted at $h$ returned by the spring $h^2$ and set in motion by the shaft $h'$ and arms $h^3$; the hammer falls again upon the metal plate $h^4$ (Fig. 1).

I and J are brushes mounted respectively upon the shafts $i'$ and $j'$. The brush I, with metallic or hard bristles, of which the shaft $i'$ carries projecting pieces $i$, plays upon a drum-skin K stretched at $k$ and produces a sound of jets of steam, imitating a locomotive for instance. The projecting pieces $i$, in turning, lift the extremities $l^2$ of the rods L fixed at $l'$; these extremities $l^2$ are furnished with a knob with felt, leather, etc. head $l$ falling again, after the passage of the projections $i$, upon the drum skin K. A shaft $m'$, analogous to the shaft $i'$, carries projecting pieces m intended to lift successively the other ends $l^3$ of the rods L, and to let them fall again with a crash upon a wooden plank M, fixed only at $m^2$, so as to obtain for example the sounds of wood violently broken. For its part the brush J rubs on a sheet N stretched in a frame N' pivoted at n and furnished with a lever handle n'. By pressing more or less the sheet N upon the brush J, by means of the lever-handle n', not only the altitude of the sounds but these sounds themselves are varied.

A pneumatic hammer O, pivoted at o' is pressed against the drum-skin K by the spring o and pulled back by the spring $o^2$; it is integral with an arm P operated by the rotating arms p of a shaft p'.

Q is a rotary cylinder, mounted on the shaft q' and carrying in its periphery flexible metallic plates q, intended to strike with violence upon a marble R supported by a piece of wood R'. The shaft q' carries crank arms $q^2$ provided with a hammer $q^3$ of which the fall upon a metal or other piece Q' can imitate the step of a horse for example. On a shaft s', forming the extension or not of the shaft q', is fixed a number of arms S turning within a spring plate S' of elliptical shape for example, provided with little bells s; this spring plate is supported at $s^2$ and upon its small diameter it is distended by the arms S which, in turning, thus sound the bells s. Lastly the sounds of sawing can be obtained by means of a cord or cable T, fixed to a spring at t and furnished with a lever-handle t' allowing of making the cord or cable T rub upon pieces of wood or metal $t^2$.

It is evident that there may be arranged in the cabinet, in addition to the arrangements described, any others known, such as a locomotive whistle, a train-conductor's bugle, a siren, a bird's song, a door-bell, etc.; when the cabinet comprises doors, these last may be utilized to imitate the sound of a room or house door which is opened or closed.

It is easily understood that in actuating one or other of the appliances indicated, other than those comprising the sheet B and the drum-skin K, these last resound although not operated and harmonize and strengthen the different sounds produced by the said appliances.

The various noise mechanisms can either be operated directly by hand or they may be operated from a single driving shaft through suitable connections. The control can similarly be electric and in this case it suffices to add to the cabinet stops placed in the orchestro: In the last case there is this advantage that the operator seeing the successive development of the scenes can produce the sounds exactly at the desired moment. But it is preferable to control the cabinet as is described with reference to Figs. 5 to 11. Referring to the last mentioned figures, at the bottom of the cabinet A is arranged a bellows U in which is stored air under pressure, furnished by a suitable pump (not shown) and delivered by a pipe u placed at its base. Above this bellows U is placed a chamber V fixed to the frame A; between this latter, called a wind-carrier, and the bellows U are arranged suitable springs, for example the wind-chest springs V'. This chamber V, or wind-carrier, which receives compressed air from the bellows U by the lows u' or stage-noise controlling device and air on the one hand directly to the little bellows u' or stage-noise controlling device and on the other hand to a chamber W by means of a pipe w. The chamber W or valve-chamber, fixed outside the frame A, carries valves W' each of which is connected to a flap $w^2$ closing a corresponding opening formed in the upper wall of the chamber W. These openings are each connected by a pipe w' to one of the controlling-devices u' of the stage-noises. At rest the different flaps $w^2$ close hermetically the chamber W and prevent the compressed air or wind from operating the bellows u'. The controlling-devices or bellows u' are of different kinds, according to the stage-noises to which they are connected. If the stage-noises require a certain force to work them, their flaps are controlled both by the chamber V and the chamber W; in the contrary case, the flaps u' may be operated simply by the wind from the chamber W. Otherwise these bellows u', their control and arrangement are well known and there is no need to describe them here in more detail. The chamber V communicates with the corresponding bellows u' by an opening v' formed half in the upper wall of V and half in the lower wall of a chamber U' (Fig. 6) integral with the bellows u' and in relation with this last by an opening $u^2$ capable of being closed by a valve $u^3$. It is easy to understand that by lowering one or more valves the compressed air may be sent into the corresponding bellows u' which thus operate the stage-noises to which they are connected. Thus, $q^2$ $q^2$ designate two pivoting levers, connected to their respective bellows u' and each carrying at the free end a cast-iron bell $q^3$; upon operating two valves W' of the said bellows u', the bells $q^3$ strike upon a marble slab Q' fixed to the frame A. This arrangement is intended to imitate the step of a horse, in different manner according to the more or less rapid movement imparted to the two levers $q^2$ by the two corresponding valves W'. X is a piece of wood in the form of a lever bent at a very obtuse angle, which is connected to its bellows u' by a lever x and which is intended to imitate the rolling of a carriage, by alternately knocking its limbs upon a cross piece of the frame A. H H are hammers connected to their controlling device u' and intended to strike alternately upon a metal plate h⁴ in order to emit the sounds of the anvil. J J are parts similar to the hammers H and strike upon a marble plate to imitate the sound of stone cutters and the like. K' represents a large chest suitably hung with mallet k' and used alone or in combination with a drum skin stretched between the uprights of the frame A for example to replace or to complete the effects of the drum-skin K previously described. K² is a drum; K³ a tambourine operated by the striker k³ and Y the well known hydraulic whistle imitating the songs of birds.

The cabinet may be furnished with several sounding plates freely suspended or fixed to the frame. On the drawings a special method has been shown of fixing the plate B serving not only for the production of thunder, running of a railroad train, etc., but likewise for the harmonizing, strengthening, etc., of the sounds given by the other stage-noises. The plate B, supported at b, is double (Fig. 6) and provided at any suitable points with adjustable dampers B' u'; a mallet b' with vibrating bellows u' (tremolo) allows of producing the rumbling of thunder, while a mallet B² with ordinary bellows gives the thunderclaps (Fig. 6).

Figs. 8 and 9 show a special arrangement for the discharges of fire-arms. These are obtained by the repeated blows of a wooden plate l³, pivoted at l' and operated by the bellows u', against the folded upper part of the plate B. The plate B comprises in addition a special contrivance intended to produce the sounds of hail and rain; this is composed essentially of metallic wires z fixed in the form of a comb upon a convex back Z which a spindle z' allows of being oscillated in one direction or the other. The wires z may be provided at their free ends with a point at right angles, a ball, etc. Fig. 8 also represents a modification in the mounting of the rotary cylinder D filled with pieces of cast iron, earthenware, etc., to produce the noise of broken crockery. The spindle d' of this cylinder is combined with a grooved pulley D², revolved by a belt (not shown) of which the movement is obtained from the pump; this pulley is mounted loose upon the spindle d' and can be moved thereupon by means of the bellows u' and the roller d³ overcoming the spring d⁶. A pin d⁴ on the pulley comes into engagement during this axial movement with a starwheel d⁵ keyed upon the spindle d' and thus revolves the drum at will.

The working of the cabinet described is of the simplest: As soon as the pump has inflated the storage bellows U sufficiently, it suffices to bring into action such or such valve W' to obtain the sound intended. Of course these sounds instead of being single may be composite and obtained in the latter case by the action of two or more valves. For this purpose, to facilitate the operation, the arrangement of the valves forms an actual keyboard within reach of the operator.

Fig. 10 is the diagram of a system of control based upon the application of a perforated band. The right of this figure represents a kinematograph film and its driving gear and upon the left of the same figure has been indicated the perforated band. As shown the shaft 1 of the wheel or wheels 2 driving the photographic band or film 3 carries at its extended extremity a small pinion 4, in mesh with a spur wheel 5 mounted at the end of a roller 6 to which it transmits a slow movement of rotation, the ratio of transmission being chosen at will. This roller 6 suitably mounted in a frame 7, is constructed of insulating material and carries at its extremities two driving wheels 8 similar to the wheels 2 which drive the film 3. These wheels 8 are intended for the driving of a perforated band 9 of which the holes 10 correspond to the different noises of the cabinet A. For this purpose, the roller 6 comprises equidistant grooves 11 in each of which is mounted a metal piece 12 subjected to the action of a spring in such a way that the pieces 12 can penetrate into the holes 10 each time that the latter come before them and make electrical contact with a metallic roller 14 of the same length as the roller 6 and placed immediately above. The number of grooves 11 and therefore of the pieces 12 is equal to the number of stage-noises and each piece 12 is connected by a specific wire to an electromagnet 15 likewise connected electrically to the roller 14. These electromagnets are placed in relation to the corresponding valves W' and furnished with an armature 16 (Fig. 7). It follows that each time that a piece 12 enters a hole 10, the circuit is completed upon the roller 14 and the armature 16 is attracted, drawing with it the corresponding valve W' which drops and actuates the noise producing mechanism just as if the valve were lowered by hand. Preferably the different conducting wires of the pieces 12 are inclosed in a cable 13 passing into the hollow shaft of the roller 6. It is obvious that this is only an ideal arrangement, capable of receiving in practice any modifications not altering its spirit. Thus the armatures 16 instead of being integral with the valves W', can be engaged in a vertical slot cut in the valve-rods and caused to press upon the bottom of these slots so as to allow equally the operation of the keyboard by hand. By choosing a suitable gear-ratio for the wheels 4 and 5, the length of the perforated band 9 can be reduced for example to the tenth of that of the film 3. Lastly the arrangement of the perforated band 9 just beside the film 3, allows in case of breakage of the film of effecting an accurate reduction of the length of the perforated band proportionate to that of the film which the operator at once repairs as is well known. Likewise a clutch may be provided to allow of releasing the driving of the perforated band and of advancing the latter by the desired length corresponding to the unused length of the film; it is convenient in this case to provide the perforated band with marks corresponding to marks upon the films.

In Fig. 10, the perforated band 9 passes over a guide-roller 17, then behind the roller 6; it is shown cut at its upper part so as to exhibit the grooves 11 and the pieces 12.

Having thus described my invention what I claim as such and desire to secure by Letters Patent is:—

1. A device for producing stage noises, comprising a portable casing, a plurality of different stage sound producing devices arranged within the same and each device having means exterior to said casing to control the operation of said device.

2. A device for producing stage noises, comprising a portable casing, a plurality of different stage sound producing devices arranged within the same and adapted to be pneumatically operated, and each device having means exterior to said casing to control the operation of said device.

3. A device for producing stage noises, comprising a portable casing, a plurality of different stage sound producing devices arranged within the same and means exterior to said casing to control the operation of said devices synchronously with a picture displaying apparatus.

In testimony whereof I have signed my name to this specification, in the presence of two subscribing witnesses.

JEAN CHARLES SCIPION ROUSSELOT.

Witnesses:
 BENJAMIN BLOCHE,
 DEAN B. MASON.